United States Patent
Kadambi et al.

(10) Patent No.: US 7,376,817 B2
(45) Date of Patent: May 20, 2008

(54) PARTIAL LOAD/STORE FORWARD PREDICTION

(75) Inventors: Sudarshan Kadambi, Sunnyvale, CA (US); Po-Yung Chang, Saratoga, CA (US); Eric Hao, Cupertino, CA (US)

(73) Assignee: P.A. Semi, Inc., Santa Clara, CA (US)

( * ) Notice: Subject to any disclaimer, the term of this patent is extended or adjusted under 35 U.S.C. 154(b) by 149 days.

(21) Appl. No.: 11/200,744

(22) Filed: Aug. 10, 2005

(65) Prior Publication Data

US 2007/0038846 A1 Feb. 15, 2007

(51) Int. Cl.
*G06F 7/38* (2006.01)
*G06F 9/00* (2006.01)
*G06F 9/44* (2006.01)

(52) U.S. Cl. .................... 712/225; 712/220
(58) Field of Classification Search ............ 712/225, 712/220
See application file for complete search history.

(56) References Cited

U.S. PATENT DOCUMENTS

| | | | |
|---|---|---|---|
| 4,521,851 A | 6/1985 | Trubisky et al. | |
| 4,594,660 A | 6/1986 | Guenthner et al. | |
| 5,276,825 A | 1/1994 | Dion | |
| 5,404,470 A | 4/1995 | Miyake et al. | |
| 5,440,752 A | 8/1995 | Lentz et al. | |
| 5,465,336 A | 11/1995 | Imai et al. | |
| 5,467,473 A | 11/1995 | Kahle et al. | |
| 5,471,598 A * | 11/1995 | Quattromani et al. | 711/122 |
| 5,475,823 A * | 12/1995 | Amerson et al. | 711/169 |
| 5,487,156 A | 1/1996 | Popescu et al. | |
| 5,490,259 A | 2/1996 | Hiraoka et al. | |

(Continued)

FOREIGN PATENT DOCUMENTS

EP 0 651 323 5/1995

(Continued)

OTHER PUBLICATIONS

Aamer Jaleel and Bruce Jacob "Using Virtual Load/Store Queues (VLSQs) to Reduce the Negative Effects of Reordered Memory Instructions", published: Feb. 2005.*

(Continued)

*Primary Examiner*—Eddie Chan
*Assistant Examiner*—Idriss Alrobaye
(74) *Attorney, Agent, or Firm*—Lawrence J. Merkel; Meyertons, Hood, Kivlin, Kowert & Goetzel, P.C.

(57) ABSTRACT

In one embodiment, a processor comprises a prediction circuit and another circuit coupled to the prediction circuit. The prediction circuit is configured to predict whether or not a first load instruction will experience a partial store to load forward (PSTLF) event during execution. A PSTLF event occurs if a plurality of bytes, accessed responsive to the first load instruction during execution, include at least a first byte updated responsive to a previous uncommitted store operation and also include at least a second byte not updated responsive to the previous uncommitted store operation. Coupled to receive the first load instruction, the circuit is configured to generate one or more load operations responsive to the first load instruction. The load operations are to be executed in the processor to execute the first load instruction, and a number of the load operations is dependent on the prediction by the prediction circuit.

22 Claims, 5 Drawing Sheets

U.S. PATENT DOCUMENTS

| | | | |
|---|---|---|---|
| 5,557,763 A | | 9/1996 | Senter et al. |
| 5,606,670 A | * | 2/1997 | Abramson et al. .......... 711/154 |
| 5,619,662 A | | 4/1997 | Steely, Jr. et al. |
| 5,625,835 A | | 4/1997 | Ebicioglu et al. |
| 5,651,125 A | | 7/1997 | Witt et al. |
| 5,652,859 A | | 7/1997 | Mulla et al. |
| 5,710,902 A | | 1/1998 | Sheaffer et al. |
| 5,717,883 A | | 2/1998 | Sager et al. |
| 5,742,791 A | | 4/1998 | Mahalingaiah et al. |
| 5,748,978 A | | 5/1998 | Narayan et al. |
| 5,751,983 A | | 5/1998 | Abramson et al. |
| 5,761,712 A | | 6/1998 | Tran et al. |
| 5,768,555 A | | 6/1998 | Tran et al. |
| 5,781,752 A | | 7/1998 | Moshovos et al. |
| 5,781,790 A | | 7/1998 | Abramson et al. |
| 5,799,165 A | | 8/1998 | Favor et al. |
| 5,802,588 A | | 9/1998 | Ramagopal et al. |
| 5,822,559 A | * | 10/1998 | Narayan et al. ............ 712/214 |
| 5,832,297 A | | 11/1998 | Ramagopal et al. |
| 5,835,747 A | * | 11/1998 | Trull ......................... 712/216 |
| 5,850,533 A | | 12/1998 | Panwar et al. |
| 5,884,060 A | | 3/1999 | Vegesna et al. |
| 5,884,061 A | | 3/1999 | Hesson et al. |
| 5,887,152 A | | 3/1999 | Tran |
| 5,923,862 A | | 7/1999 | Nguyen et al. |
| 5,996,068 A | | 11/1999 | Dwyer, III et al. |
| 6,016,540 A | | 1/2000 | Zaidi et al. |
| 6,021,485 A | | 2/2000 | Feiste et al. |
| 6,108,770 A | * | 8/2000 | Chrysos et al. ............. 712/216 |
| 6,122,727 A | | 9/2000 | Witt |
| 6,141,747 A | | 10/2000 | Witt |
| 6,212,622 B1 | | 4/2001 | Witt |
| 6,212,623 B1 | | 4/2001 | Witt |
| 6,266,744 B1 | | 7/2001 | Hughes et al. |
| 6,393,536 B1 | | 5/2002 | Hughes et al. |
| 6,481,251 B1 | * | 11/2002 | Meier et al. .................... 70/52 |
| 6,502,185 B1 | | 12/2002 | Keller et al. |
| 6,523,109 B1 | * | 2/2003 | Meier ......................... 712/225 |
| 6,542,984 B1 | | 4/2003 | Keller et al. |
| 6,622,237 B1 | | 9/2003 | Keller et al. |
| 6,625,723 B1 | * | 9/2003 | Jourday et al. ............. 712/217 |
| 6,651,161 B1 | * | 11/2003 | Keller et al. ................ 712/216 |
| 6,658,559 B1 | * | 12/2003 | Arora et al. ................ 712/245 |
| 6,678,807 B2 | * | 1/2004 | Boatright et al. ........... 711/154 |
| 6,694,424 B1 | | 2/2004 | Keller et al. |
| 6,728,867 B1 | * | 4/2004 | Kling ......................... 712/216 |
| 6,918,030 B2 | * | 7/2005 | Johnson ..................... 712/225 |
| 7,062,617 B2 | * | 6/2006 | Dundas ...................... 711/154 |
| 7,181,598 B2 | * | 2/2007 | Jourdan et al. ............. 712/217 |

FOREIGN PATENT DOCUMENTS

| | | |
|---|---|---|
| EP | 0 651 331 | 5/1995 |
| EP | 0 709 770 | 5/1996 |
| EP | 0 727 737 | 8/1996 |
| GB | 2 281 442 | 3/1995 |
| WO | WO 96/12227 | 4/1996 |
| WO | WO 97/27538 | 7/1997 |

OTHER PUBLICATIONS

Leibholz et al., "The Alpha 21264: A 500 MHz Out-of Order Execution Microprocessor," Copyright 1997 IEEE, pp. 28-36.

Popescu et al., "The Metaflow Architecture," IEE Micro Jun. 1991, pp. 10-13 and 63-73.

Moshovos et al., "Speculative Memory Cloaking and Bypassing" pp. 1-15 Oct. 1999.

Moshovos et al., "Streamlining Inter-Operation Memory Communication via Data Dependence Prediction" IEEE pp. 1-11 Dec. 1997.

Gopal et al., "Speculative Versioning Cache" pp. 1-11 Feb. 1998.

Chrysos et al., "Memory Dependence Prediction Using Store Sets," Copyright 1998 IEEE, pp. 142-153.

Moshovos et al., "Dynamic Speculation and Synchronization of Data Dependences," Copyright 1997 ACM pp. 181-193.

Johnson, Superscalar Microprocessor Design, Pretice-Hall, 1991, pp. 127-129.

Gwennap, "Digital 21264 Sets New Standard," Microdesign Resources, vol. 10, No. 14, Oct. 1996, pp. 103-108.

* cited by examiner

PARTIAL LOAD/STORE FORWARD PREDICTION

BACKGROUND

1. Field of the Invention

This invention is related to the field of processors and, more particularly, to handling load/store operations in processors.

2. Description of the Related Art

Processors generally include support for loads and stores to facilitate transfer of data between the processors and memory to which the processors may be coupled. As used herein, a load is an operation specifying a transfer of data from a main memory to the processor (although the transfer may be completed in cache). A store is an operation specifying a transfer of data from the processor to memory. Loads and stores may be an implicit part of an instruction which includes a memory operation, or may be explicit instructions.

A given load/store may specify the transfer of multiple bytes beginning at a memory address calculated during execution of the load/store. For example, 16 bit (2 byte), 32 bit (4 byte), and 64 bit (8 byte) transfers are common in addition to an 8 bit (1 byte) transfer. The number of bytes transferred for a given load/store is generally referred to as the size of the transfer. The address is typically calculated by adding one or more address operands specified by the load/store to generate an effective address or virtual address, which may optionally be translated through an address translation mechanism to a physical address of a memory location within the memory. Typically, the address may identify any byte as the first byte to be transferred, and the additional bytes of the multiple byte transfer are contiguous in memory to the first byte and stored at increasing (numerical) memory addresses.

Many processors execute loads/stores speculatively (that is, before the results can be committed to architected state or memory). For stores, the updated bytes are often stored in a queue until the stores can be committed to a data cache (or to memory). Thus, a load may be executed, and one or more bytes updated responsive to a previous uncommitted store in the queue may be accessed responsive to the load. However, since there are various sizes of loads and stores and also since loads and stores of the same size may partially (but not fully) overlap, it is possible that one or more additional bytes that are not updated responsive to the previous uncommitted store may be accessed responsive to the load. For brevity herein, accessing bytes responsive to a load may be referred to as the load accessing bytes. Similarly, updating bytes responsive to a store may be referred to as the store updating bytes.

If a load accesses one or more bytes updated by a previous uncommitted store and also accesses one or more additional bytes not updated by a previous uncommitted store, hardware may be implemented to select the bytes updated by the store from the queue and the additional bytes from another source (such as a data cache) to obtain the bytes accessed by the load. However, such hardware may be complex and expensive to implement. Alternatively, the load may be cancelled and attempted again at a later time, after the previous store is committed. However, such a design may experience a loss of performance due to the delay of the load and due to the resources consumed unnecessarily to execute the load, only to cancel it and wait for subsequent reexecution.

SUMMARY

In one embodiment, a processor comprises a prediction circuit and another circuit coupled to the prediction circuit. The prediction circuit is configured to predict whether or not a first load instruction will experience a partial store to load forward (PSTLF) event during execution. A PSTLF event occurs if a plurality of bytes, accessed responsive to the first load instruction during execution, include at least a first byte updated responsive to a previous uncommitted store operation and also include at least a second byte not updated responsive to the previous uncommitted store operation. Coupled to receive the first load instruction, the circuit is configured to generate one or more load operations responsive to the first load instruction. The load operations are to be executed in the processor to execute the first load instruction, and a number of the load operations is dependent on the prediction by the prediction circuit.

In another embodiment, a method comprises predicting whether or not a first load instruction will experience a PSTLF event during execution; and generating one or more load operations responsive to the first load instruction for execution, wherein a number of the load operations is dependent on the prediction.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

A processor may include a partial store to load forward (PSTLF) predictor that predicts which loads are likely to experience a PSTLF event. As used herein, a PSTLF event may occur if at least one byte accessed by a load is updated by a previous uncommitted store and at least one other byte accessed by the load is not updated by that same previous uncommitted store. An uncommitted store may refer to a store which has not yet been written to its destination (e.g. it may be queued awaiting non-speculative status or awaiting an opportunity to update the data cache or memory). For example, in one implementation, uncommitted stores may be stored in a load/store queue (LSQ) in a load/store (L/S) unit within the processor. A previous uncommitted store, when referring to a particular load, may be an uncommitted store that is prior to the particular load.

In response to a PSTLF prediction for a load instruction, the processor may increase the number of load operations generated for the load instruction as compared to the number of load operations generated if the PSTLF prediction does not occur. For example, a load that is defined to access a doubleword, word, or halfword may be performed with one load operation if not predicted to experience a PSTLF event, and two or more load operations if predicted to experience a PSTLF event. The number of load operations generated for a predicted PSTLF event, and the size of each load operation, may vary from embodiment to embodiment. Several embodiments are described in more detail below. A word may be defined as any number of bytes, depending on the instruction set architecture implemented by the processor. In one embodiment, a word is 4 bytes. Other embodiments may define a word as more or fewer bytes.

When a PSTLF is predicted, the generated load operations may each access a portion of the plurality of bytes accessed by the load instruction. If each generated load operation accesses only bytes updated by a previous uncommitted store, or only bytes not updated by a previous uncommitted store, then each generated load operation may obtain bytes from the appropriate source. The bytes may be accumulated as the result of the load. In some embodiments, additional operations (e.g. arithmetic/logic unit (ALU) operations) may be generated to merge the results of the load operations to produce the plurality of bytes accessed by the load instruction and to write the plurality of bytes to the target register of the load instruction. For example, one or more ALU operations to shift each of the results of the generated load operations to its proper position in the final result and ORing the shifted results may be used.

In some embodiments, predicting the PSTLF event for a load instruction and dividing the load instruction into multiple load operations may avoid replay of the load operations due to the PSTLF event, at least in some cases. Each load operation may obtain bytes from the correct source (e.g. a previous uncommitted store, the data cache, etc.) and the bytes may be merged to form the result of the load instruction without experiencing the performance loss associated with replaying the load operations. Additionally, hardware to provide bytes for a load operation from multiple sources may be avoided in some embodiments.

As used herein, a load instruction may include any instruction defined in the instruction set architecture implemented by the processor that causes a load. Thus, load instructions may include instructions that implicitly specify a load. Load instructions may also include explicit load instructions. A load operation may include an operation generated within the processor that is to be executed by the processor to perform a load (or part of a load). In some embodiments, the processor may generate one or more micro-operations (microops) for each instruction defined in the instruction set architecture. In such embodiments, load microops may be generated. In other embodiments, microop generation may not be performed (e.g. most instructions in the instruction set architecture may be directly executed in the processor), but multiple load instructions may be generated for a predicted-PSTLF load instruction. The generated load instructions may be load operations for such embodiments.

In one embodiment, the PSTLF predictor predicts loads that have been fetched or are being fetched, and provides the prediction to a decode unit. The decode unit may generate the load operations for execution in the processor. In other embodiments, microop generation may not be implemented in the processor and the decode unit may generate multiple load instructions as the load operations. In still other embodiments, a PSTLF prediction may be carried with the load instruction through the pipeline of the processor. When scheduling the instruction for execution, the processor may use the prediction to generate the desired number of load operations for the instruction. Generally, the PSTLF prediction and the generation of the load operations may occur at any point prior to execution.

In some embodiments, the instruction set architecture may support string instructions in which a single instruction is defined to access a variable number of bytes starting at the address specified by the address operands of the instruction. The number of bytes is specified by a byte count operand. The decode unit may generate multiple microops to access a given size (e.g. a word), and the number of generated microops may depend on the byte count. In such embodiments, the PSTLF predictor may predict which microop in the set of microops may experience a PSTLF event, if a PSTLF event is predicted. The decode unit may generate more memory operation microops for a string instruction if a PSTLF event is predicted than if a PSTLF event is not predicted for that string instruction.

An example implementation will be described in more detail below for an embodiment of a processor that implements an instruction set architecture that includes explicit load/store instructions. Particularly, the PowerPC™ instruction set architecture will be used as an example. Other instruction set architectures may be implemented in other embodiments, including instruction set architectures that include implicit memory operations. Exemplary instruction set architectures that may be implemented in other embodiments may include the ARM™ instruction set, the MIPS™ instruction set, the SPARC™ instruction set, the x86 instruction set (also referred to as IA-32), the IA-64 instruction set, etc.

Figure 1:
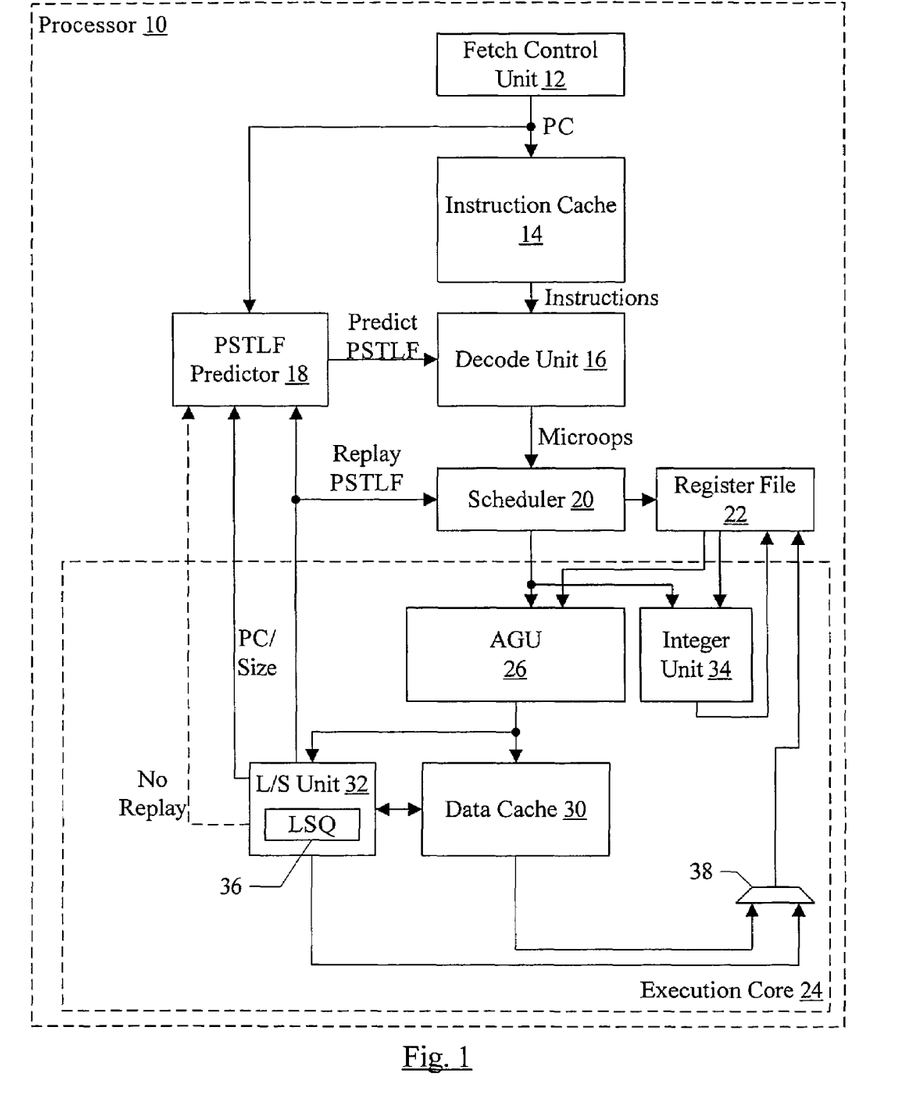
FIG. 1 is a block diagram of one embodiment of a processor.

Turning now to FIG. 1, a block diagram of one embodiment of a processor 10 is shown. In the illustrated embodiment, the processor 10 includes a fetch control unit 12, an instruction cache 14, a decode unit 16, a PSTLF predictor circuit 18, a scheduler 20, a register file 22, and an execution core 24. In the illustrated embodiment, the execution core 24 includes an address generation unit (AGU) 26, a data cache 30, a load/store unit 32 (which includes an LSQ 36), and an integer unit 34. The fetch control unit 12 is coupled to provide a program counter (PC) for fetching from the instruction cache 14 and is coupled to provide the PC to the PSTLF predictor 18. The instruction cache 14 is coupled to provide instructions to the decode unit 16, which is coupled to provide microops to the scheduler 20. The decode unit 16 is also coupled to receive a PSTLF prediction (Predict PSTLF in FIG. 1) from the PSTLF predictor 18. The scheduler 20 is coupled to receive a Replay PSTLF signal from the L/S unit 32, is coupled to the register file 22, and is coupled to provide microops for execution to the address generation unit 26 and the integer unit 34. The register file 22 is coupled to provide operands to the address generation unit 26 and the integer unit 34, and is coupled to receive results to be written to the register file 22 from the integer unit 34 and from a mux 38. The mux 38 is coupled to receive data from the data cache 30 and the L/S unit 32. The address generation unit 26 is configured to provide an address to the data cache 30 for access, and also provides the address to the load/store unit 32. The load/store unit 32 is coupled to the data cache 30. The load/store unit 32 is coupled to provide the Replay PSTLF signal, a PC of a load instruction, and a size to the PSTLF predictor 18. Additionally, in some embodiments, the load/store unit 32 may signal no replay for a load operation to the PSTLF predictor 18 (No Replay in FIG. 1). It is noted that the PC of an instruction may be an address that locates the instruction itself in memory. That is, the PC is the address that may be used to fetch the instruction. The PC may be an effective or virtual address that is translated to the physical address actually used to access the memory, or may be a physical address, in various embodiments.

The PSTLF predictor 18 may predict which load instructions are likely to experience a PSTLF event, and may provide the prediction to the decode unit 16. The decode unit 16 may be configured to generate load microops in response to a load instruction fetched from the instruction cache 14. If the PSTLF predictor 18 predicts a PSTLF event for a load instruction, the decode unit 16 may generate two or more load microops. Each load microop may perform a portion of the load access. If the PSTLF predictor 18 does not predict a PSTLF event for a non-string load instruction, the decode unit 16 may generate one load microop for the load instruction. Thus, in general, the number of load microops generated by the decode unit 16 may be dependent on the PSTLF prediction from the PSTLF predictor 18.

The first load microop generated by the decode unit 16 may use the address operands of the load instruction to form the address to be accessed. The second load microop may use the address from the first memory operation microop, incremented by the size of the first load microop (e.g. doubleword, word, halfword, or byte). In some embodiments, the decode unit 16 may generate a microop between the first load microop and the second load microop to facilitate the address generation for the second load microop. For example, the intervening microop may add the address operands of the load instruction and write the result to a register that may be used as an address operand of the second load microop. The intervening microop may also add the size increment, or the size increment may be included in the address operands of the second load microop, in various embodiments. In still other embodiments, if the address operands and the size increment are provided as address operands of the second load microop, the intervening microop to add the address operands need not be generated. Subsequent microops, if any, may be generated similarly. As mentioned previously, the decode unit 16 may also generate one or more additional microops to combine the results of the load microops to form the final result for writing into the target register of the load instruction.

The decode unit 16 may generally be configured to generate microops for each instruction provided from the instruction cache 14. Generally, the microops may each be an operation that the hardware included in the execution core 24 is capable of executing. Each instruction may translate to one or more microops which, when executed, result in the performance of the operations defined for that instruction according to the instruction set architecture. The decode unit 16 may include any combination of circuitry and/or microcoding in order to generate microops for instructions. For example, relatively simple microop generations (e.g. one or two microops per instruction) may be handled in hardware while more extensive microop generations (e.g. more than three microops for an instruction) may be handled in microcode. The number of microops generated per instruction in hardware versus microcode may vary from embodiment to embodiment.

Microops generated by the decode unit 16 may be provided to the scheduler 20, which may store the microops and may schedule the microops for execution in the execution core 24. The PC of the instruction corresponding to each microop may also be stored by the scheduler 20. In some embodiments, the scheduler 20 may also implement register renaming and may map registers specified in the microops to registers included in the register file 22. When a microop is scheduled, the scheduler 20 may read its source operands from the register file 22 and the source operands may be provided to the execution core 24. For load/store microops, the source operands include address operands used to generate the address of the memory location accessed by the load/store operation. Address operands of a load/store operation may include register operands provided from the register file 22 as well as displacement operands encoded in the load/store microop itself.

Load/store microops may be scheduled to the address generation unit 26, which generates the address of the load/store operation from the address operands. If address translation is enabled, the address generated by the address generation unit 26 may be an effective address or virtual address, to be translated to a physical address through the address translation mechanism. For example, the data cache 30 may include address translation hardware such as a translation lookaside buffer that stores the results of previous translations. Alternatively, separate memory management unit (MMU) hardware may be provided to perform translations, in parallel with the data cache 30, between the data cache 30 and the address generation unit 26, or in the address generation unit 26.

The address from the address generation unit 26 is provided to the data cache 30 and to the load/store unit 32. For load microops, the load data may be provided from either the data cache 30 or the load/store unit 32 through the mux 38. For example, the data may be provided by load/store unit 32 from the LSQ 36, if the load accesses bytes updated by a previous uncommitted store that is in the LSQ 36. The data may be provided from the data cache 30 if the load is a hit in the data cache 30 and the data is not provided from a previous uncommitted store in the LSQ 36. In some embodiments, a memory request buffer used to communicate with a memory system may be used as a store merge buffer for committed stores, and data may be forwarded from the memory request buffer as well.

Additionally, the load/store unit 32 may be configured to detect the PSTLF event for a load operation. The size of the load operation may be provided from the scheduler 20 (e.g. pipelined through the address generation unit 26 to the load/store unit 32). Generally, the load/store unit 32 may compare the address provided from the AGU 26 for a load operation to the address of stores queued in the LSQ 36, and may use the size information in the comparison as well. If a previous store in the LSQ 36 updates at least one byte accessed by the load operation, and at least one other byte accessed by the load operation is not updated by the store operation, the load/store unit 32 may signal a replay of the load operation using the Replay PSTLF signal. Additionally, the load/store unit 32 may provide the PC of the load instruction corresponding to the load operation and optionally may provide size data to the PSTLF predictor 18. The size data may indicate the size of the store operation that caused that PSTLF event, or the number of bytes that would be provided by the store operation, for example. The size data may also indicate the size, or sizes, of the load operations that are to be generated when the PSTLF is predicted for a subsequent execution of the load instruction. In other embodiments, the PC of the load instruction may be supplied to the PSTLF predictor 18 from another source, such as the scheduler 20 (responsive to the Replay PSTLF signal).

The scheduler 20 receives the Replay PSTLF signal, and may update its state to cause the replayed load operation to be rescheduled at a later time. Thus, updates to the PSTLF predictor 18 may affect the load instruction for which the PSTLF event is detected on subsequent fetches of the load instruction, but not for the current execution. The scheduler 20 may also reschedule any subsequent microops, or subsequent microops that are dependent on the load microop that is replayed. In one embodiment, the scheduler 20 may track which microops are in which pipeline stages in the execution core 24, and may thus associate the Replay PSTLF signal with the appropriate microop. In other embodiments, the Replay PSTLF signal may also identify the microop to the scheduler 20 (e.g. using a tag that identifies the entry in the scheduler that stores the microop). As used herein, a replay may refer to cancelling a current execution of an operation and requesting that execution be reattempted at a later time.

The PSTLF predictor 18 receives the Replay PSTLF signal and the PC of the load instruction. The PSTLF predictor 18 may update its state to predict the PSTLF event for the load instruction. For example, in one embodiment, the PSTLF predictor 18 may update with the PC of the load instruction, and may compare the PC to fetch PCs from the fetch control unit 12 to predict the PSTLF event for subsequent fetches of the load instruction.

The PSTLF predictor 18 may also store information indicating how the load instruction is to be divided into multiple load operations when a PSTLF event is predicted for the load instruction, in some embodiments. For example, in one implementation, the PSTLF predictor 18 may implement a "binary search" type of algorithm. In the binary search method, the first detection of the PSTLF event for a load instruction may cause the processor 10 to divide the load instruction into two load operations having half the size of the load instruction. One load operation accesses the upper half of the data accessed by the load instruction, and the other load operation accesses the lower half of the data accessed by the load instruction. If a subsequent execution of the load instruction using the two load operations still results in a replay being signalled for at least one of the load operations, the load instruction may subsequently be divided into four load operations, each accessing non-overlapping quarters of the data accessed by the load instruction. Alternatively, only the load operation for which the PSTLF event is detected (from the original two) may be divided into two load operations. Such division of the load instruction into successively smaller load operations may be performed until a PSTLF event is not detected for the load operations.

In another implementation, the PSTLF predictor 18 may use the size information provided by the load/store unit 32 to determine the correct sizes of the load operations to be generated for the load instruction. Load operations of different sizes, either accessing bytes not updated by the store operation or accessing bytes that are updated by the store operation, may thus be generated. For example, if a load doubleword accesses two bytes from the cache, followed by four bytes of a previously uncommitted store word instruction, followed by two more bytes from the cache (or another store), the size data may be used to indicate generate of three load operations. The first load operation may be a load halfword operation to access the first two bytes; the second load operation may be a load word operation to access the middle four bytes; and the third load operation may be a load halfword operation to access the last two bytes.

In yet another implementation, size information may not be stored in the PSTLF predictor 18 and the decode unit 16 may generate load byte operations that each load a byte of the data accessed by a load instruction. Since a byte is the smallest granularity of update by a store operation, each load operation may obtain its byte from a source without replay.

In still another implementation, the load/store unit 32 may detect a load operation that accesses bytes updated by two or more previous store operations. The load/store unit 32 may determine the size of the bytes obtained from each previous store operation, and may report the smallest of the sizes. The decode unit 16, responsive to the PSTLF prediction, may generate load operations having the smallest size as reported by the load/store unit 32.

In some embodiments, the load/store unit 32 may also be configured to detect that the PSTLF event was predicted by the PSTLF predictor 18 but the PSTLF event was not actually experienced. For example, the load operations generated responsive to a PSTLF prediction may be tagged or may have a different encoding than other load operations. If such load operations are executed and the LSQ 36 is not storing any previous store operations having the same address (at some granularity, such as a cache line) as the load operations, then no PSTLF event occurs. If the PSTLF event was predicted but not detected, the load/store unit 32 may signal no replay to the PSTLF predictor 18 and may provide the PC similar to providing the PC for replay detection. The PSTLF predictor 18 may update its state to not predict the PSTLF event for the load instruction in such cases. Removing PSTLF predictions from the PSTLF predictor 18 may not be implemented in other embodiments.

In the some embodiments, updating the PSTLF predictor 18 may include more than allocating in response to a detected PSTLF event that was not predicted and optionally invalidating in response to a lack of a PSTLF event when a PSTLF event is predicted. For example, a strength bit or counter may be used to indicate how often a PSTLF event has occurred. A PSTLF entry may be allocated in the weak (or weakest) state. For each correct prediction of a PSTLF event, the strength may be increased and for each incorrect prediction of a PSTLF event, the strength may be decreased. If an incorrect prediction is detected and the entry is in the weakest state, the entry may be invalidated. Any mechanism for updating the PSTLF predictor may be used in various embodiments.

In addition to maintaining the LSQ 36 for queuing uncommitted store operations and detecting PSTLF events, the load/store unit 32 may have various other functions in some embodiments. For example, the load/store unit 32 may also enforce various load/store ordering rules, participate in cache miss handling, etc.

In the embodiment of FIG. 1, the execution core 24 also includes an integer unit 34. The integer unit 34 may be configured to perform various integer operations. For example, the integer unit 34 may be configured to execute the microop that adds the address operands of a load microop to produce an address operand for a second load microop corresponding to the same load instruction. The integer unit 34 may also be configured to execute the microop(s) that merge the results of the load microops for a load instruction that experiences a PSTLF event into the target register of the load instruction.

The register file 22 may generally comprise any set of registers usable to store operands and results of microops executed in the processor 10. In some embodiments, the register file 22 may comprise a set of physical registers and the scheduler 20 may map the logical registers to the physical registers. The logical registers may include both architected registers specified by the instruction set architecture implemented by the processor 10 and temporary registers that may be used as destinations of microops for temporary results (and sources of subsequent microops as well). In other embodiments, the register file 22 may comprise an architected register set containing the committed state of the logical registers and a speculative register set containing speculative register state.

The fetch control unit 12 may comprise any circuitry used to generate PCs for fetching instructions. The fetch control unit 12 may include, for example, branch prediction hardware used to predict branch instructions and to fetch down the predicted path. The fetch control unit 12 may also be redirected (e.g. via misprediction, exception, interrupt, flush, etc.).

The instruction cache 14 may be a cache memory for storing instructions to be executed by the processor 10. The instruction cache 14 may have any capacity and construction (e.g. direct mapped, set associative, fully associative, etc.). The instruction cache 14 may have any cache line size. For example, 64 byte cache lines may be implemented in one embodiment. Other embodiments may use larger or smaller cache line sizes. In response to a given PC from the fetch control unit 12, the instruction cache 14 may output up to a maximum number of instructions. For example, up to 4 instructions may be output in one embodiment. Other embodiments may use more or fewer instructions as a maximum.

While the embodiment of FIG. 1 shows the execution core 24 including an address generation unit 26, a load/store unit 32, an integer unit 32, and a data cache 30, other embodiments may include any desired components. For example, multiple address generation units, integer units, load/store units, and/or data caches may be provided. Other units may be provided as well (e.g. one or more floating point units, one or more graphics units, one or more cryptographic units, etc.). Generally, the execution core 24 may include any circuitry for executing instructions (or microops, in the illustrated embodiment).

It is noted that, while the PSTLF predictor 18 uses the PC generated by the fetch control unit 12 in the illustrated embodiment to make predictions, other embodiments may use the PC corresponding to instructions being output by the instruction cache 14 to the decode unit 16, or a PC that is being pipelined through the instruction cache 14. Furthermore, other embodiments may use other information to identify instructions for PSTLF prediction (e.g. a portion of the instruction itself, a portion of the PC, a tag assigned to the instruction by the processor 10, etc.).

It is noted that, while the illustrated embodiment uses a scheduler, other embodiments may implement other microarchitectures. For example, a reservation station/reorder buffer microarchitecture may be used. If in-order execution is implemented, other microarchitectures without out of order execution hardware may be used.

It is noted that, while the decode unit 16 generates microops in the present embodiment, other embodiments may decode and execute instructions from the instruction set architecture directly. In such embodiments, the decode unit 16 may generate multiple instructions for memory operations that are predicted to experience a PSTLF event.

Figure 2:
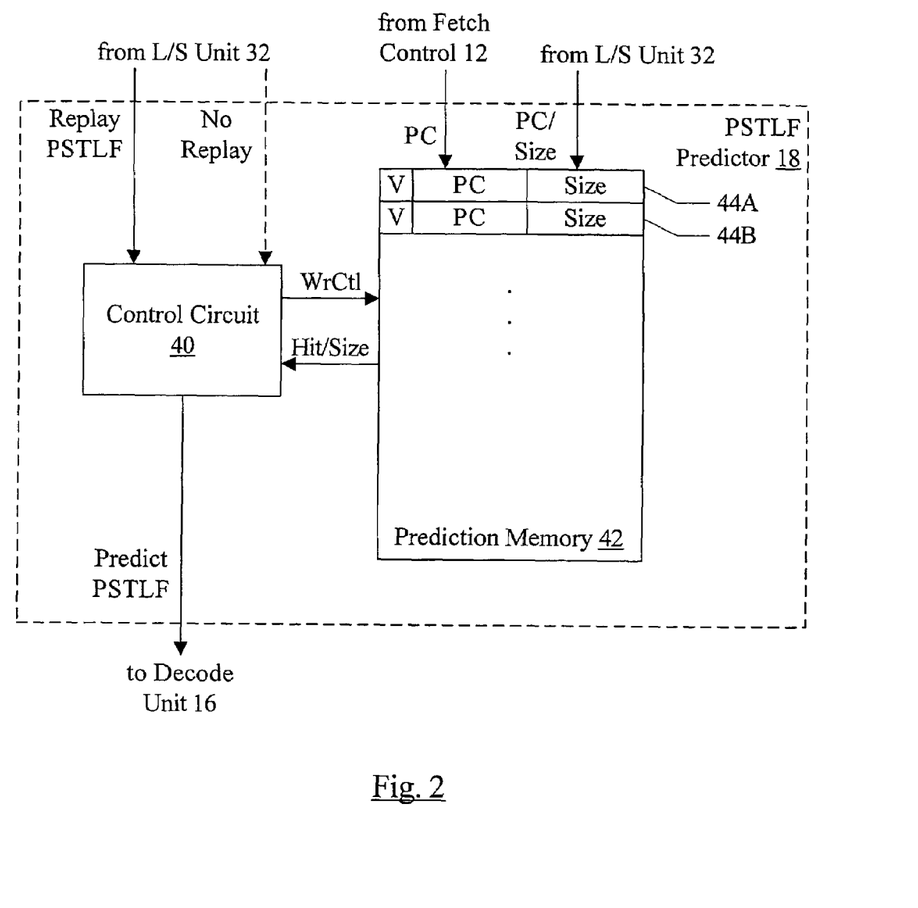
FIG. 2 is a block diagram of one embodiment of a partial store to load forward (PSTLF) predictor.

Turning now to FIG. 2, a block diagram of one embodiment of the PSTLF predictor 18 is shown. In the embodiment of FIG. 2, the PSTLF predictor 18 includes a control circuit 40 and a prediction memory 42. The control circuit 40 is coupled to receive the Replay PSTLF and No Replay signals from the load/store unit 32, and to send the Predict PSTLF output to the decode unit 16. The control circuit 40 is also coupled to the prediction memory 42. For example, in FIG. 2, the control circuit 40 is coupled via a write control (WrCtl) and a hit/size (Hit/Size) to the prediction memory 42. The prediction memory 42 is coupled to receive the PC from the fetch control unit 12 and to receive the PC and size from the load/store unit 32.

The prediction memory 42 may store information used to make PSTLF predictions for load instructions. For example, in the illustrated embodiment, the prediction memory 42 may comprise a plurality of entries, two of which (entries 44A-44B) are illustrated in FIG. 2. Each entry 44 may include a valid bit (V) indicating whether or not the entry is valid, a PC of a load instruction that was previously executed and experienced a PSTLF event, and a size field indicating the size of the load microops to be generated for the load instruction (if applicable).

The PC provided by the fetch control unit 12 is coupled to the prediction memory 42, and may be compared to the PCs in the entries 44 of the prediction memory 42 to detect a hit. That is, the prediction memory 42 may be a content address memory (CAM) and the comparison may be on the PC field of the entries (qualified with the valid bit being set to indicate a hit). If a hit is detected, the prediction memory 42 may assert a hit signal to the control circuit 40 and may provide the size data from the hitting entry. The control circuit 40 may convey a PSTLF prediction to the decode unit 16 responsive to detection of a hit in the prediction memory 42. The PSTLF prediction may indicate whether or not the PSTLF event is predicted, and may include the size data from the hitting entry in some embodiments. In some embodiments, the hit/size output of the prediction memory 42 may be forwarded directly as the PSTLF prediction to the decode unit 16.

The control circuit 40 is coupled to receive the replay PSTLF signal. If a replay due to a PSTLF is signalled, the control circuit 40 may select an entry in the prediction memory 42 to store the PC of the load instruction (and the size data, if any). The control circuit 40 may use the write control to the prediction memory 42 to cause the prediction memory 42 to update the selected entry with the PC and size received from the load/store unit 32.

In some embodiments, a PSTLF event may be detected even if the corresponding load instruction was predicted to experience a PSTLF event. In some embodiments, the control circuit 40 may be configured to check if the PC provided from the load/store unit 32 is a hit prior to allocating a new entry, to avoid allocating multiple entries to the same load instruction. In such embodiments, for example, the PC from the load/store unit 32 may be CAMmed against the prediction memory 42, and the hitting entry (if any) may be used to generate the write control to the prediction memory 42.

The control circuit 40 may manage the entries in the prediction memory 42 in any fashion. For example, the control circuit 40 may manage the entries in a first-in, first-out (FIFO) fashion in which the control circuit 40 writes PCs to consecutive entries in the prediction memory 42, overwriting the oldest entries after the prediction memory becomes full. Other embodiments may use other configurations. For example, the prediction memory 42 may be managed similar to a direct mapped or set associative cache, in which one or more entries are eligible to store a given PC. Rather than CAMming the entries to detect a hit for a PC from the fetch control unit 12, the entry or entries indexed by the PC may be read and compared to the PC.

Similarly, the control circuit 40 may select an eligible entry to store a PC and size provided by the load/store unit 32.

In some embodiments, the PSTLF predictor 18 may receive the no replay signal from the load/store unit 32. If the no replay signal indicates that a predicted PSTLF event was not detected, the control circuit 40 may search the prediction memory 42 for the PC provided by the load/store unit 32. If the PC is found, the entry may be invalidated. The search may be performed by CAMming the PC provided by the load/store unit 32 or by checking entries indexed by the PC, for example.

In some embodiments, each entry in the prediction memory 42 may include predictions for multiple instructions. For example, each entry may include predictions for the maximum number of instructions that may be concurrently fetched from the instruction cache 12. In such embodiments, if a hit is detected for a given PC, each of the predictions may be provided to the decode unit 16. The decode unit 16 may associate each prediction with the corresponding instruction received from the instruction cache 14.

While the present embodiment has been described as storing the PC in each entry of the prediction memory 42 and comparing the stored PCs to the PC received from the fetch control unit 12, other embodiments may store and compare a portion of the PC. Aliasing of PCs that differ only in the excluded bits may occur in such embodiments. The decode unit 16 may verify that the instruction for which a PSTLF prediction is provided is in fact a load instruction.

Figure 3:
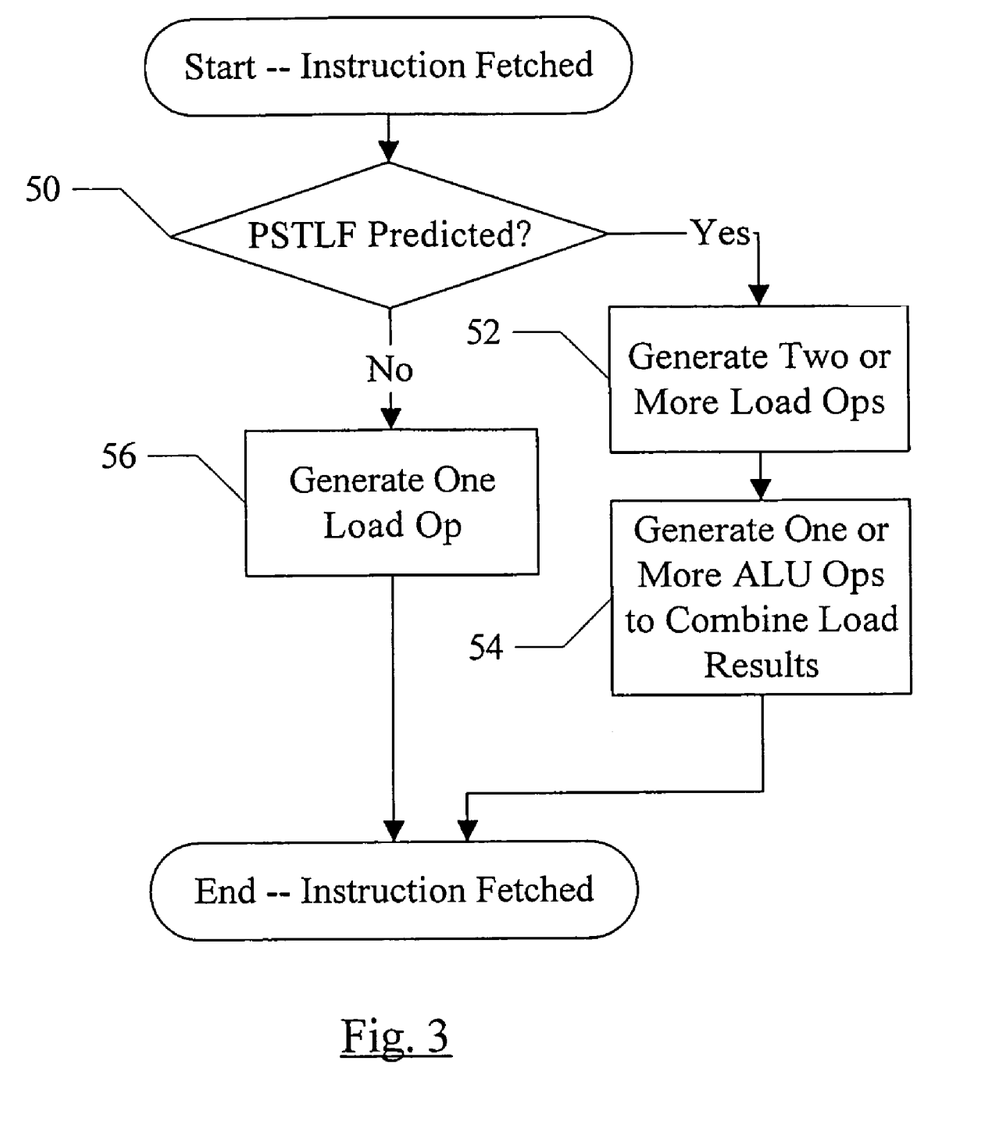
FIG. 3 is a flowchart illustrating operation of one embodiment of a processor in response to a fetched instruction.

Turning now to FIG. 3, a flowchart is shown illustrating operation of one embodiment of the processor 10 (more specifically the PSTLF predictor 18 and the decode unit 16) in response to fetching one or more instructions. While the blocks are shown in a particular order for ease of understanding, other orders may be used. Furthermore, blocks may be performed in parallel in combinatorial logic within the processor 10. Blocks, portions of the flowchart, or the flowchart as a whole may be pipelined over multiple clock cycles, in some embodiments.

The PSTLF predictor 18 may receive the PC of the fetched instructions, and may determine if a PSTLF event is to be predicted for a fetched load instruction. For example, the PC may be CAMmed against the prediction memory to detect a hit or miss in the prediction memory. If a PSTLF event is predicted (decision block 50, "yes" leg), the PSTLF predictor 18 may convey the PSTLF prediction to the decode unit 16. In some embodiments, the decode unit 16 may verify that the fetched instruction is actually a load instruction to qualify the prediction. In response to the PSTLF prediction, the decode unit 16 may generate two or more load operations for the load instruction (block 52). The number of load operations may depend on the size information from the PSTLF predictor 18, if provided. The number may also depend on the scheme implemented for generating load operations in response to a predicted PSTLF event, such as the schemes described for various implementations above (e.g. binary search, multiple load byte operations, load operations based on size information, etc.). The decode unit 16 may also generate one or more ALU operations to combine the results of the load operations to form the load instruction's result (block 54). For example, the ALU operations may include one or more operations to shift the load operations' results into the correct location in the final result, and ORing of the shifted results.

On the other hand, if a PSTLF event is not predicted (decision block 50, "no" leg), the decode unit 16 may generate one load operation for the load instruction (block 56). While the embodiment of FIG. 3 illustrates generating one load operation if no PSTLF event is predicted and two or more load operations if a PSTLF event is predicted, other embodiments may generate more than one load operation if no PSTLF event is predicted. The number of load operations generated if a PSTLF event is predicted for a given load operation may be greater than the number of load operations generated if no PSTLF event is predicted for that given load operation.

Figure 4:
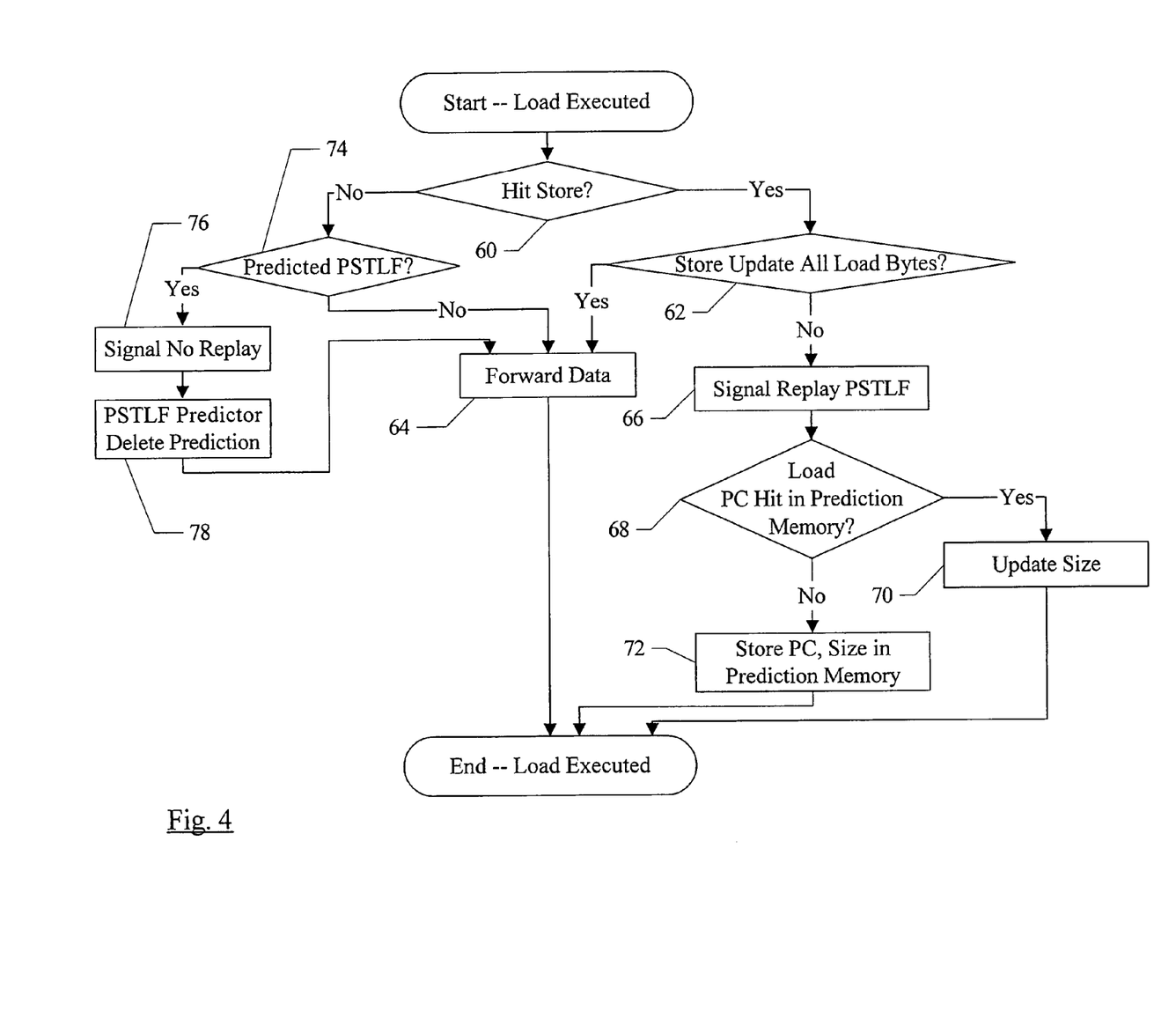
FIG. 4 is a flowchart illustrating operation of one embodiment of a processor during execution of a load operation.

Turning next to FIG. 4, a flowchart is shown illustrating operation of one embodiment of the processor 10 when a load operation is executed (e.g. in the execution core 24). While the blocks are shown in a particular order for ease of understanding, other orders may be used. Furthermore, blocks may be performed in parallel in combinatorial logic within the processor 10. Blocks, portions of the flowchart, or the flowchart as a whole may be pipelined over multiple clock cycles, in some embodiments.

The load/store unit 32 may receive the address and size of the load operation, and may determine if the load operation "hits a store" in the LSQ 36 (decision block 60). A load operation may hit a store if the load operation accesses at least one byte updated by the store. If the load operation hits a store (decision block 60, "yes" leg) and the store updates all bytes accessed by the load (decision block 62, "yes" leg), the load result may forwarded from the LSQ 36 (block 64). If the load operation hits a store (decision block 60, "yes" leg) and the store does not update all bytes accessed by the load (decision block 62, "no" leg), the load/store unit 32 may assert the Replay PSTLF signal to replay the load operation (block 66). In response to the replay, the scheduler 20 may update its state to cause the load to be rescheduled at a later time. Additionally, the PSTLF predictor 18 may update responsive to the replay. In one embodiment, the PSTLF predictor 18 may check if the load PC (of the load instruction corresponding to the load operation) is a hit in the prediction memory 42 (decision block 68). If so (decision block 68, "yes" leg), the PSTLF predictor 18 may update the hitting entry (e.g. with size data provided by the load/store unit 32) (block 70). If the load PC is not a hit in the prediction memory 42 (decision block 68, "no" leg), the PSTLF predictor 18 may allocate an entry in the prediction memory 42 and may update the entry to store the PC and the size data (if applicable) (block 72). In other embodiments, checking for a hit of the load PC before allocating an entry may not be performed. Additionally, the size data may not be implemented in some embodiments.

If the load operation does not hit a store (decision block 60, "no" leg), the load/store unit 32 may determine if the load operation was predicted to experience a PSTLF event (decision block 74). Determining if a PSTLF event was predicted (and updating the PSTLF predictor 18 in response to a predicted PSTLF event that was not detected) may not be implemented in some embodiments. If the load operation was predicted to experience a PSTLF event but none was detected (decision block 74, "yes" leg), the load/store unit 32 may signal no replay to the PSTLF predictor 18 (block 76). It is noted that detecting that a store was not hit for signalling no replay may be at a coarser granularity than determining a hit for forwarding data. For example, a store within the same cache line (or within the total size of the load instruction corresponding to the load operation) may be used for signalling no replay. In response to the No Replay signal, the PSTLF predictor 18 may update to delete the prediction for the corresponding load instruction (block 78). In either case of a load operation not hitting a store, data may be forwarded (block 64). For example, if the data cache 30 detects a hit for the load operation, data may be forwarded from the data cache 30. If a data cache miss is detected, the data may be forwarded upon receipt from the memory subsystem.

Figure 5:
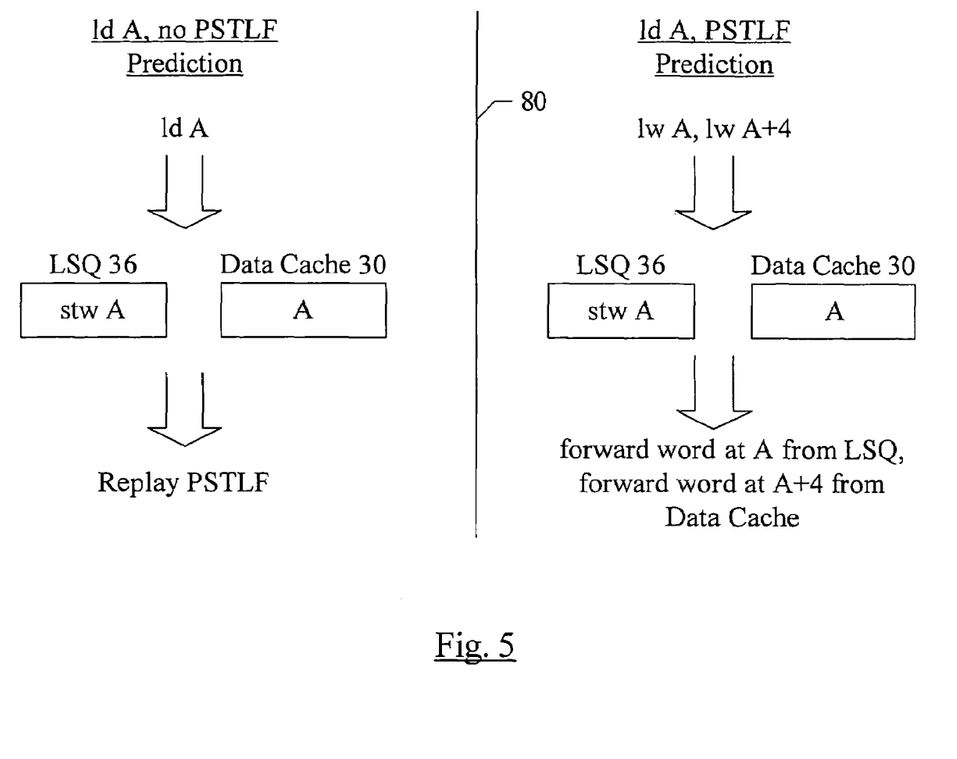
FIG. 5 is a block diagram illustrating an example of load instructions with and without prediction of partial store to load forwarding.

Turning now to FIG. 5, an example of a load doubleword (ld) executed with no PSTLF prediction and with a PSTLF prediction is shown for one embodiment of the processor 10. A solid vertical line 80 separates the example with no PSTLF prediction (to the left of the line 80) from the example with PSTLF prediction (to the right of the line 80).

In both examples, the LSQ 36 is illustrated as having a previous uncommitted store word operation (stw) to the same address "A" as the ld. Thus, the first four bytes accessed by the ld are updated by the stw. The last four bytes accessed by the ld are not updated by the stw, and thus are in the cache line containing A in the data cache 30 in these examples.

In the example with no PSTLF prediction (left side of line 80), a ld operation is executed. The load/store unit 32 detects the stw in the LSQ 32 and the PSTLF event, and thus replays the ld operation due to a PSTLF. In the example with a PSTLF prediction (right side of the line 80), two load word (lw) operations are executed, one to address A and one to address A+4. The load/store unit 32 detects that the stw to address A supplies all bytes for the lw to address A, and thus forwards the word from LSQ 36. The load/store unit 32 does not detect a store that updates any bytes accessed by the lw to address A+4, and thus the data cache forwards the word at A+4 for the second lw operation. Accordingly, due to the PSTLF prediction and the division of the ld instruction into lw operations, replay is avoided in the example with PSTLF prediction.

Numerous variations and modifications will become apparent to those skilled in the art once the above disclosure is fully appreciated. It is intended that the following claims be interpreted to embrace all such variations and modifications.

What is claimed is:

1. A processor comprising:
a prediction circuit configured to predict whether or not a first load instruction will experience a partial store to load forward (PSTLF) event during execution, wherein a PSTLF event occurs for the first load instruction when a plurality of bytes accessed during execution of the first load instruction include at least a first byte updated responsive to a previous uncommitted store operation and also include at least a second byte not updated responsive to the previous uncommitted store operation; and
a circuit coupled to the prediction circuit and coupled to receive the first load instruction, wherein the circuit is configured to generate one or more load operations responsive to the first load instruction and further responsive to the prediction from the prediction circuit, wherein the load operations are to be executed in the processor to execute the first load instruction, and wherein a number of the load operations is dependent on the prediction by the prediction circuit, and wherein, responsive to the prediction that the PSTLF event occurs, two or more load operations are generated, and wherein each load operation accesses a different portion of the plurality of bytes that are accessed responsive to the first load instruction, and wherein each load operation is independently executable in the processor to access the different portion of the plurality of bytes, and wherein the two or more load operations are generated prior to executing any of the two or more load operations and wherein, responsive to generating more than one load operation for the first load instruction, the circuit is configured to generate one or more arithmetic/logic unit (ALU) operations to merge the results of the two or more load operations to produce the result of the first load instruction.

2. The processor as recited in claim 1 wherein the number of the load operations generated in response to the prediction circuit predicting the PSTLF event is greater than the number of load operations generated in response to the prediction circuit not predicting the PSTLF event.

3. The processor as recited in claim 2 wherein the number of the load operations generated in response to the prediction circuit not predicting the PSTLF event is one, and wherein the number of load operations generated in response to the prediction circuit predicting the PSTLF event is two or more.

4. The processor as recited in claim 3 wherein the prediction circuit is further configured to provide a size indication, and wherein the number of load operations is further responsive to the size indication.

5. The processor as recited in claim 1 further comprising a load/store unit coupled to the prediction circuit, wherein the load/store unit includes a load/store queue configured to queue previous uncommitted store operations, and wherein the load/store unit is configured to detect a first load operation that experiences a PSTLF event with at least one of the previous uncommitted store operations in the load/store queue, and wherein the first load operation corresponds to the first load instruction, and wherein the load/store unit is configured to provide an indication of the detected PSTLF event to the prediction circuit.

6. The processor as recited in claim 5 further comprising a scheduler configured to schedule the first load operation for execution, and wherein the scheduler is configured to receive the indication from the load/store unit and is configured to subsequently reschedule the first load operation for execution.

7. The processor as recited in claim 5 wherein the prediction circuit is configured to update to predict the PSTLF event for the first load responsive to the indication from the load/store unit.

8. The processor as recited in claim 7 wherein the prediction circuit comprises a prediction memory and a control circuit coupled to the prediction memory and to receive the indication, wherein the control circuit is configured to allocate an entry in the prediction memory to correspond to the first load instruction responsive to the indication.

9. The processor as recited in claim 8 wherein the prediction memory is coupled to receive a program counter address (PC) of the first load instruction and is configured to store the PC in the entry allocated to the first load instruction.

10. The processor as recited in claim 8 wherein, in the case that there is a previously allocated entry for the first load instruction, the control circuit is configured to update the previously allocated entry instead of allocating the entry.

11. The processor as recited in claim 7 wherein the load/store unit is further configured to detect that no PSTLF event would occur for the first load instruction during execution and that the prediction circuit predicted the PSTLF event, and wherein the load/store unit is configured to provide a second indication responsive to the detection.

12. The processor as recited in claim 11 wherein the prediction circuit is configured to update to not predict the PSTLF event for the first load instruction responsive to the second indication.

13. The processor as recited in claim 1 wherein the circuit comprises a decode unit.

14. A method comprising:
predicting whether or not a first load instruction will experience a partial store to load forward (PSTLF) event during execution, wherein a PSTLF event occurs for the first load instruction when a plurality of bytes, accessed responsive to the first load insiniction during execution, include at least a first byte updated responsive to a previous uncommitted store operation and also include at least a second byte not updated responsive to the previous uncommitted store operation;
generating one or more load operations for execution responsive to the first load instruction and further responsive to the predicting, wherein a number of the load operations is dependent on the predicting, and wherein, responsive to the prediction that the PSTLF event occurs, two or more load operations are generated, and wherein each load operation accesses a different portion of the plurality of bytes that are accessed responsive to the first load instruction, and wherein each load operation is independently executable in the processor to access the different portion of to plurality of bytes, and wherein the two or more load operations are generated prior to executing any of the two or more load operations; and
responsive to generating two or more load operations for the first load instruction, generating one or more arithmetic/logic unit (ALU) operations to merge the results of the two or more load operations to produce the result of the first load instruction.

15. The method as recited in claim 14 wherein the number of the load operations generated responsive to the prediction of the PSTLF event is greater than the number of load operations generated responsive to the PSTLF event not being predicted.

16. The method as recited in claim 15 wherein the number of the load operations generated responsive to the PSTLF event not being predicted is one, and wherein the number of load operations generated responsive to the prediction of the PSTLF event is two or more.

17. The method as recited in claim 14 further comprising, during a previous execution of the first load instruction, detecting the PSTLF event, wherein the predicting is responsive to the detecting.

18. The method as recited in claim 14 wherein the predicting is responsive to receiving a program counter address (PC) of the first load instruction.

19. The method as recited in claim 18 wherein the predicting is responsive to matching the PC of the first load instruction to a PC stored in a prediction circuit.

20. A processor comprising:
a prediction circuit configured to predict whether or not a first load instruction will experience a partial store to load forward (PSTLF) event during execution, wherein a PSTLF event occurs for the first load instruction when a plurality of bytes, accessed responsive to the first load instruction during execution, include at least a first byte updated responsive to a previous uncommitted store operation and also include at least a second byte not updated responsive to the previous uncommitted store operation; and
a circuit coupled to the prediction circuit and coupled to receive the first load instruction, wherein the circuit is configured to generate one or more load operations responsive to the first load instruction and further responsive to the prediction from the prediction circuit, wherein the load operations are to be executed in the processor to execute the first load instruction, and wherein a number of the load operations is dependent on the prediction by the prediction circuit, and wherein the number of the load operations generated responsive to the prediction circuit predicting the PSTLF event is greater than the number of load operations generated responsive to the prediction circuit not predicting the PSTLF event, and wherein each load operation accesses a different portion of the plurality of bytes that are accessed responsive to the first load instruction, and wherein each load operation is independently executable in the processor to access a different portion of the plurality of bytes, and wherein the one or more load operations are generated prior to executing any of the two or more load operations, and wherein, in the event that the circuit generates more than one load operation for the first load instruction, the circuit is configured to generate one or more arithmetic/logic unit (ALU) operations to merge the results of the one or more load operations to produce the result of the first load instruction.

21. The processor as recited in claim 20 wherein the number of the load operations generated responsive to the prediction circuit not predicting the PSTLF event is one, and wherein the number of load operations generated responsive to the prediction circuit predicting the PSTLF event is two or more.

22. The processor as recited in claim 21 wherein the prediction circuit is further configured to provide a size indication, and wherein the number of load operations is further responsive to the size indication.

* * * * *

UNITED STATES PATENT AND TRADEMARK OFFICE
CERTIFICATE OF CORRECTION

PATENT NO. : 7,376,817 B2  Page 1 of 1
APPLICATION NO. : 11/200744
DATED : May 20, 2008
INVENTOR(S) : Sudarshan Kadambi, Po-Yung Chang and Eric Hao It is certified that error appears in the above-identified patent and that said Letters Patent is hereby corrected as shown below:

Claim 14, col. 15, line 8, please delete "insiniction" and insert --instruction-- in place thereof.

Signed and Sealed this

Twenty-ninth Day of July, 2008

JON W. DUDAS
*Director of the United States Patent and Trademark Office*